United States Patent
Yoon

(10) Patent No.: US 8,873,110 B2
(45) Date of Patent: Oct. 28, 2014

(54) HOST APPARATUS TO GENERATE WORKFORM, WORKFORM MANAGEMENT SERVER TO EDIT AN IMAGE, WORKFORM MANAGEMENT SYSTEM, AND METHOD OF EDITING AN IMAGE USING A WORKFORM

(75) Inventor: Ha Young Yoon, Hwaseong-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 133 days.

(21) Appl. No.: 13/554,086

(22) Filed: Jul. 20, 2012

(65) Prior Publication Data

US 2013/0021652 A1  Jan. 24, 2013

(30) Foreign Application Priority Data

Jul. 21, 2011  (KR) ........................ 10-2011-0072271

(51) Int. Cl.
*H04N 1/387* (2006.01)
*G06F 15/00* (2006.01)
*G06F 3/12* (2006.01)
*G06K 1/00* (2006.01)

(52) U.S. Cl.
CPC ..................................... *H04N 1/387* (2013.01)
USPC ............................................ 358/452; 358/1.15

(58) Field of Classification Search
CPC ......................................................... H04N 1/387
USPC .................... 358/1.1, 1.15, 1.13, 1.14, 452
See application file for complete search history.

(56) References Cited

U.S. PATENT DOCUMENTS

2010/0092090 A1* 4/2010 Hibi et al. ................. 382/190
2011/0010420 A1* 1/2011 Kagitani ................... 709/203

\* cited by examiner

*Primary Examiner* — Douglas Tran
(74) *Attorney, Agent, or Firm* — Staas & Halsey LLP

(57) ABSTRACT

A host apparatus, a workform management system, a method of generating a workform and a method of executing a workform, in which an image editing plug-in capable of editing a scanned image is available for use in a workform, so that repetitive and frequently occurring jobs in image editing are easily processed by creating and executing a workform, thereby reducing unnecessarily repetitive jobs.

19 Claims, 20 Drawing Sheets

FIG. 7

| LOAN APPLICATION |||||
|---|---|---|---|---|
| NAME | | RESIDENT REGISTRATION NUMBER | | |
| ADDRESS | | PHONE | | |
| | | MOBILE | | |

CITIZEN'S IDENTIFICATION CARD ~500
~510

REQUEST FOR LOAN APPLICATION IS CONFORMED

SUBSCRIBER: _____(SIGNATURE)_____  DATE

FIG. 8

| NAME | | RESIDENT REGISTRATION NUMBER | |
|---|---|---|---|
| ADDRESS | | PHONE | |
| | | MOBILE | |

BANK ACCOUNT APPLICATION

CITIZEN' S IDENTIFICATION CARD  ~600
~610

REQUEST FOR BANK TRANSCATION IS CONFORMED

SUBSCRIBER:           (SIGNATURE)          DATE

FIG. 13

```
<ImageEdit>
        <ImageInput>
                <File ID="1" Type=jpg" Width="616" Height="862"/>
                <File ID="2" Type=jpg" Width="616" Height="862"/>
                <File ID="3" Type=jpg" Width="616" Height="862"/>
        <ImageInput>
        <Edit>
                <Job ID="1" Type="Copy" InImage="1" OutImage="4">
                        <Copy X="4" Y="1" Width="249" Height="156"/>
                </Job>
                <Job ID="2" Type="Paste' InImage="2" OutImage="5" Label="2-1">
                        <Paste Image="4" X="277" Y="419"/>
                </Job>
                <Job ID="3" Type="Paste' InImage="3" OutImage="6" Label="3-1">
                        <Paste Image="4" X="277" Y="419"/>
                </Job>
                <Job ID="4" Type="Size" InImage="5" OutImage="7" Label="2-2">
                        <Size Scale="0.25"/>
                </Job>
                <Job ID="5" Type="Size" InImage="6" OutImage="8" Label="3-2">
                        <Size Scale="0.5"/>
                </Job>
        </Edit>
        <ImageOutput>
                <File ID="1" Type=jpg" Width="616" Height="862" TargerImage="5"/>
                <File ID="2" Type=jpg" Width="616" Height="862" TargerImage="6"/>
                <File ID="3" Type=jpg" Width="308" Height="431" TargerImage="7"/>
                <File ID="4" Type=jpg" Width="308" Height="431" TargerImage="8"/>
        </ImageOutput>
</ImageEdit>
```

FIG. 16

```xml
<Workform>
  <Input>-<Plugin GUID="{9D5C7F86-ABF2-40c8-8B38-5EF7D7129E63}" RunAt="Device">
        <Param SUMMARY="true" TYPE="Input" VISIBLE="false" name="Name">
              <label>Scan</label>
              <value>Scan</value>
        </Param>
        <Param CONFIG="true" Log="true" PRESET="Yes" PREFERENCE="Yes" SUMMARY="true" TYPE="STRING" name="ColorMode">
              <label>Color Mode</label>
              <value>Mono</value>
              <value selected="true">Color</value>
        </Param>-</Plugin>
  </Input>
  <Transform>
    <Plugin GUID="{1158452-B81B-4a21-8F83-3192154D32F9}" Runat="Server">
       <Param CONFIG="true" EDITABLE="true" TYPE="STRING" VISIBLE="true" name="JobDetail">
         <label>Job Detail</label>
         <value> <ImageEdit>-<ImageInput>
               <File ID="1" Type="jpg" Width="616" Height="862"/>
               <File ID="2" Type="jpg" Width="616" Height="862"/>
               <File ID="3" Type="jpg" Width="616" Height="862"/>
         </ImageInput>
         <Edit>
               <Job ID="1" Type="Copy" InImage="1" OutImage="4">
                     <Copy X="4" Y="1" Width="249" Height="156">
               </Job>
               <Job ID="2" Type="Paste" InImage="2" OutImage="5" Label="2-1">
                     <Paste Image="4" X="277" Y="419"/>
               </Job>
               <Job ID="3" Type="Paste" InImage="3" OutImage="6" Label="3-1">
                     <Paste Image="4" X="277" Y="419"/>
               </Job>
               <Job ID="4" Type="Size" InImage="5" OutImage="7" Label="2-2">
                     <Size Scale="0.25"/>
               </Job>
               <Job ID="5" Type="Size" InImage="6" OutImage="8" Label="3-2">
                     <Size Scale="0.5"/>
               </Job>
         </Edit>
         <ImageOutput>
               <File ID="1" Type="jpg" Width="616" Height="862" TargetImage="5"/>
               <File ID="2" Type="jpg" Width="616" Height="862" TargetImage="6"/>
               <File ID="3" Type="jpg" Width="308" Height="431" TargetImage="7"/>
               <File ID="4" Type="jpg" Width="308" Height="431" TargetImage="8"/>
         </ImageOutput>-<ImageInput>-</value>
       </Param>
    </Plugin>
  </Transform>
  <Transmit>-<Plugin GUID="{131C6634-B81B-4a21-8F83-3192154D32F9}" Runat="Server">
       <Param SUMMARY="true" TYPE="Transmit" name="Name">
         <label>Folder</label>
         <value>Folder</value>
       </Param>
       <Param CONFIG="true" EDITABLE="true" MAXVALUE="64" OPTIONAL="false" TYPE="STRING" name="OutputPath">
         <label>Folder Location</label>
         <value>D:\temp\2011</value>
       </Param>
    </Plugin> </Transmit>
</Workform>
```

LOAN APPLICATION

| NAME | | RESIDENT REGISTRATION NUMBER | |
|---|---|---|---|
| ADDRESS | | PHONE | |
| | | MOBILE | |

CITIZEN'S IDENTIFICATION CARD
HWANG, MIN-HEE(黃民熙)
xxxxxx - xxxxxxx

REQUEST FOR LOAN APPLICATION IS CONFORMED

SUBSCRIBER: _____ (SIGNATURE)    DATE

HOST APPARATUS TO GENERATE WORKFORM, WORKFORM MANAGEMENT SERVER TO EDIT AN IMAGE, WORKFORM MANAGEMENT SYSTEM, AND METHOD OF EDITING AN IMAGE USING A WORKFORM

CROSS-REFERENCE TO RELATED APPLICATIONS

This application claims the priority benefit of Korean Patent Application No. 10-2011-0072271, filed on Jul. 21, 2011 in the Korean Intellectual Property Office, the disclosure of which is incorporated herein by reference.

BACKGROUND

1. Field

Embodiments of the present disclosure relate to a host apparatus, a workform management system, a workform generating method, and a workform executing method.

2. Description of the Related Art

In general, an image forming apparatus performs various types of jobs, such as scanning, server transmission, fax transmission/reception, and email sending.

In order for the image forming apparatus to automatically perform many jobs, a user needs to input information about a job to be performed and details of the job.

To this end, a workform is built up for managing a job that the image forming apparatus provides, and is executed in the image forming apparatus such that the job is executed according to job details that are set in the workform. The details of the job mainly relate to adjusting a resolution of a scanned image, setting scanning features, such as a color mode or a mono mode, or setting a scanner paper setting, for example.

In recent years, a paper document has been replaced with an electronic paper due to the constraints with storing paper documents and costs. In a number of industries, including a financial world, one of the most frequent jobs is to insert or integrate images into various paper documents created in a work process, the image inserting or integrating job being increased in favor of easy management and by the nature of the work.

According to a conventional technology, there is a difficulty associated with an image editing about forming a new image by extracting a predetermined area of a scanned image and inserting the extracted area of the scanned image into another image.

Accordingly, in order to perform such an image editing, a user needs to manually edit scanned images. For example, if an identification card needs to be inserted into a loan application, a user scans both of the loan applications and the identification card, cuts outs a desired area of the scanned identification card, pastes the cutout area to the loan application, and then scan the loan application having the cutout area pasted thereto.

SUMMARY

Therefore, it is an aspect of the present disclosure to provide a host apparatus, a workform management system, a workform generating method, and a workform executing method capable of generating a workform where a scanned image is edited.

Additional aspects of the disclosure will be set forth in part in the description which follows and, in part, will be apparent from the description, or may be learned by practice of the disclosure.

In accordance with an aspect of the present disclosure, a method of generating a workform that defines a job sequence is as follows. First, job information is generated. The job information is used to edit an image which is scanned by an image forming apparatus when a workform is executed. Thereafter, workform including the generated job information is generated.

In the generating of the job information, the job information is a data that records a series of editing processes that are performed by a user on a sample image through an image editor.

In the generating of the job information, the job information includes job information used to combine a plurality of images scanned by the image forming apparatus.

In the generating of the job information, the job information includes job information that is used to reduce a size of at least one of an original image and an edited image.

In the generating of the workform, the job information is included in the workform such that the job information is linked to an image editing plug-in that is configured to import an image and edit the imported image.

In the generating of the workform, the workform is generated in an eXtensible Markup Language (XML) format.

In accordance with another aspect of the present disclosure, a method of executing a workform including job information used to edit an image is as follows. First, a scanned image is received from an image forming apparatus that executes the workform. The received scanned image is edited based on the job information. The edited image is stored.

The editing of the received image is performed as follows. A series of job processes of the job information is detected and the received image is edited according to the series of job processes by use of an image editing plug-in that is configured to import an image and edit the imported image.

In accordance with another aspect of the present disclosure, a host apparatus configured to generate a workform that defines a job sequence includes a user interface unit, a job information generating unit, a workform generating unit, a storage unit and a host control unit. The user interface unit is configured to provide an interface to a user. The job information generating unit is configured to generate job information which is used to edit an image that is scanned by the image forming apparatus, according to an input by the user. The workform generating unit is configured to generate a workform in which the job information generated in the job information generating unit is linked to an image editing plug-in that imports the scanned image and edits the imported image. The storage unit is configured to store the job information generated by the job information generating unit and the workform generated by the workform generating unit. The host control unit is configured to control the job information generating unit and the workform generating unit such that the job information generating unit and the workform generating unit generate the job information and the workform, respectively.

The job information includes at least one of job information which is used to combine a plurality of images scanned by the image forming apparatus, and job information which is used to reduce a size of at least one of an original image and an edited image.

The job information generating unit generates a file that records a series of editing processes that are performed by a user on a sample image through an image editor.

The job information is formed in a command that is executable in the image editing plug-in such that the image editing plug-in imports an image that is scanned by the image forming apparatus and edits the imported image according to the job information.

In accordance with another aspect of the present disclosure, a workform management server connected to an image forming apparatus includes a storage unit, a communication interface unit, an image editing unit and a server control unit. The storage unit is configured to store a workform including job information that is used to edit an image. The communication interface unit is configured to receive an image that is scanned by the image forming apparatus that executes the workform. The image editing unit is configured to detect the job information by analyzing the workform and to edit the received image based on the detected job information. The server control unit is configured to control the image editing unit such that the received image is edited and to store the edited image in the storage unit.

The image editing unit includes an image editing plug-in which is configured to import an image and edit the imported image, and wherein the image editing unit detects a series of job processes of the job information by use of the image editing plug-in and edits the received image according to the series of job processes In accordance with another aspect of the present disclosure, a workform management system includes a host apparatus, an image forming apparatus and a workform management server. The host apparatus is configured to generate job information used to edit an image which is scanned by an image forming apparatus when a workform defining a job sequence is executed, and to generate a workform including the job information. The image forming apparatus is configured to receive the workform from the host apparatus, perform a scanning by executing the received workform and send a scanned image. The workform management server is configured to receive the scanned image from the image forming apparatus, detect the job information by analyzing the workform, edit the received image based on the detected job information and store the edited image.

The job information generated in the host apparatus includes at least one of job information which is used to combine a plurality of images scanned by the image forming apparatus, and job information which is used to reduce a size of at least one of an original image and an edited image.

As described above, since an image editing plug-in capable of editing a scanned image is available for use in a workform, repetitive and frequently occurring jobs in image editing are easily processed by creating and executing a workform. Accordingly, unnecessarily repetitive jobs are reduced. For example, in a conventional technology, a user needs to place a citizen's identification card on a predetermined area of a loan application and scan the loan application having the identification placed thereon. However, according to the embodiment of the present disclosure, such repetitive and cumbersome jobs in image editing are formed into a workform by use of an image editor and an image editing plug-in and whenever a loan applicant visits, the job is automatically performed by executing the workform.

In addition, the image editing plug-in includes an image downsizing function reducing the size of an edited image, thereby reducing the amount of storage that edited images occupy. For example, according to a conventional technology, in order to reduce the size of an image of a loan application having a citizen's identification card combined therewith, a user needs to perform scanning with a lower resolution. However, according to the embodiment of the present disclosure, the size of a loan application having the citizen's identification card combined therewith is automatically reduced by executing a workform including an image editing plug-in.

BRIEF DESCRIPTION OF THE DRAWINGS

These and/or other aspects of the disclosure will become apparent and more readily appreciated from the following description of embodiments, taken in conjunction with the accompanying drawings of which:

FIG. 7 is a diagram illustrating a loan application which is used to generate job information for image editing in a host apparatus of a workform management system according to an embodiment of the present disclosure.

FIG. 8 is a diagram illustrating a bank account application which is used to generate job information for image editing in a host apparatus of a workform management system according to an embodiment of the present disclosure.

FIG. 13 is a diagram illustrating details on job information that are generated by use of an image editor of a host apparatus of a workform management system according to an embodiment of the present disclosure.

FIG. 16 is a diagram illustrating a workform which is generated in a host apparatus of a workform management system according to an embodiment of the present disclosure.

DETAILED DESCRIPTION

Figure 1:
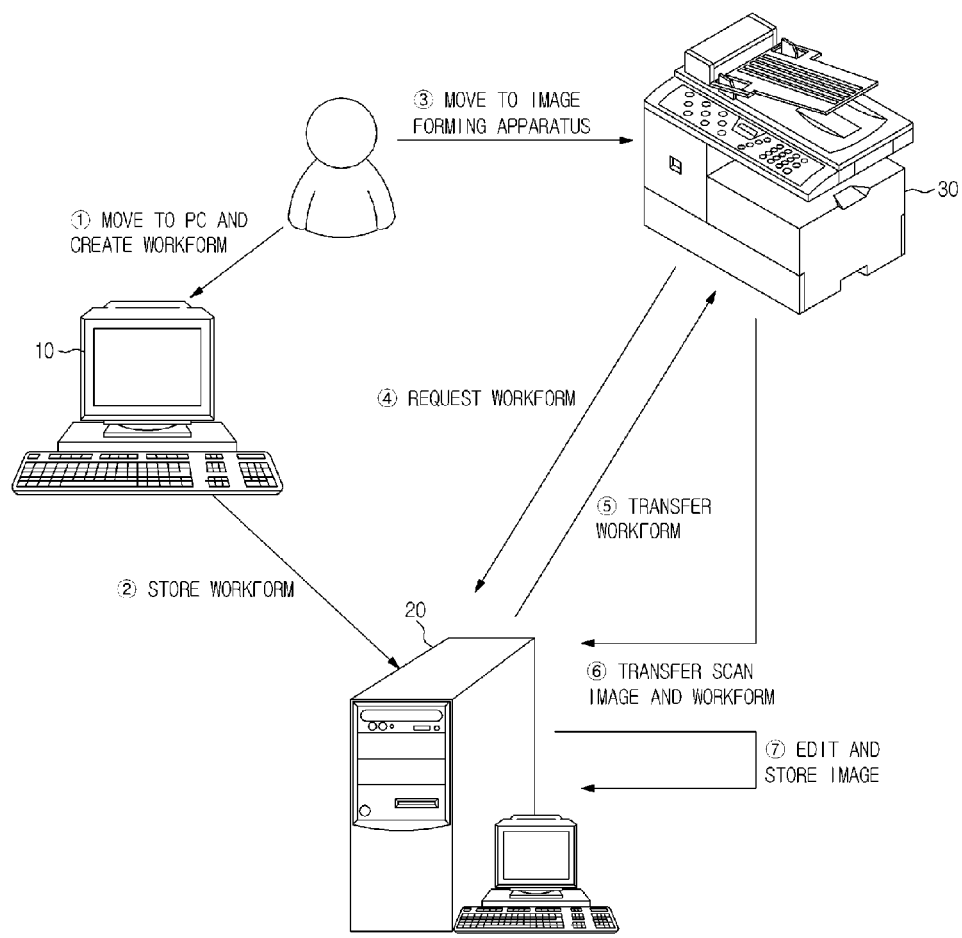
FIG. 1 is a configuration diagram illustrating a workform management system according to an embodiment of the present disclosure.

Reference will now be made in detail to embodiments of the present disclosure, examples of which are illustrated in the accompanying drawings, wherein like reference numerals refer to like elements throughout.

FIG. 1 is a configuration diagram illustrating a workform management system according to an embodiment of the present disclosure.

Referring to FIG. 1, a workform management system includes a host apparatus 10, a workform management server 20, and an image forming apparatus 30 that are connected to communicate with one another through wired, wireless or hybrid networks.

The host apparatus 10 may be, for example, a mobile phone, a personal computer, a personal digital assistant (PDA), a laptop computer, and etc.

The workform management server 20 stores login information of registered users, for example, ID and passwords, and a plurality of workforms that are set according to users. The workform management server 20 may be a computer which is managed by an administrator and also used by a general user. The workform management server 20 may serve as a destination, to which a scanned image is transmitted while serving to edit a scanned image.

The image forming apparatus 30 is an apparatus configured to execute a workform which is generated in the host apparatus 10 or in the workform management server 20. The image forming apparatus 30 may be represented as a multi-function device, a printer, a facsimile, a scanner, a photo copier, etc.

The image forming apparatus 30 displays a workform that is received from the workform management server 20, the workform selected by a user and operates based on a job selected in the displayed workform. When the workform is executed, the image forming apparatus 30 scans a document and transmits the scanned image to the workform management server 20.

The workform includes information used to perform the job provided by the image forming apparatus 30. For example, the workform may include information on a job specified by a user, a device to perform the job, the job sequence, the job condition and the location where the result data of the job is stored. By using a stored workform, a user easily performs a job without having to repeatedly perform a set-up process. A workform may be generated in an eXtensible Markup Language (XML) format.

The workform includes an input source which provides a data, and a destination to which the data is transmitted. For example, the data may be documents to be scanned, the input source may be the image forming apparatus 30 that performs a scanning on the documents and the destination may be the workform management server 20 to which the scanned images are transmitted.

According to a conventional technology, an editing on an image scanned by an image forming apparatus is limited to an image conversion, such as an automatic rotation and an automatic color balance of a scanned image. Accordingly, there is an increasing demand for an image editing technology capable of forming a new image by extracting and inserting a predetermined area of a scanned image.

According to such a conventional technology, if an image editing job is required, a user needs to perform a manual editing on the scanned images. For example, if a citizen's identification card needs to be placed onto a loan application which is filled out by an applicant, a user scans the loan application and the citizen's identification card, cuts a desired area of the scanned citizen's identification card, pastes the cutout area to a relevant area of the loan application, and then scans the loan application having the cutout area of the citizen's identification card pasted thereto.

According to an embodiment of the present disclosure, job information used to edit an image which is to be scanned by the image forming apparatus when a workform is executed, is generated, and then a workform including job information is generated. Thus, repetitive and frequently occurring image editing jobs are easily processed by creating a workform and by executing the workform, thereby reducing unnecessary and repetitive jobs.

A user may create a workform which includes the job information used to edit an image, in the host apparatus 10, the workform management server 20, or the image forming apparatus 30. For example, if a user logs on to the workform management server 20 through the host apparatus 10, the workform management server 20 either directly provides a Graphic User Interface (GUI) to generate a workform or indirectly provides the GUI through the host apparatus 20, and the user creates a workform which includes job information for image editing.

As shown in FIG. 1, a user creates a workform which includes job information for image editing (①). The created workform is then transmitted to the workform management server 20, and is stored in the workform management server 20 (②). The workform may be generated in an eXtensible Markup Language (XML). In FIG. 1, a user creates a workform in the host apparatus 10, but the generating of a workform is not limited thereto. For example, according to another embodiment, a user may directly create a workform in the workform management server 20 by connecting to the workform management server 20. According to another embodiment, a user may also directly create a workform in the image forming apparatus 30.

When the user moves to the image forming apparatus (③) and requests transmission of a workform (④), the workform management server 20 transmits the stored workform to the image forming apparatus 30 (⑤).

The image forming apparatus 30 scans a document by executing the received workform, and transmits the scanned image and the workform to the workform management server 20 (⑥). The workform management server 20 receives the scanned image and the workform from the image forming apparatus 30, detects the job information for image editing included in the workform which is received together with the scanned image, edits the scanned image based on the detected job information, and stores the edited image (⑦).

Figure 2:
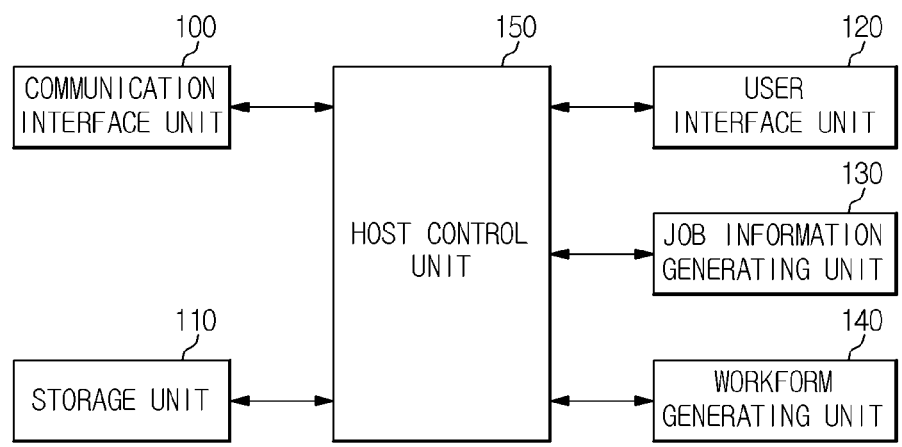
FIG. 2 is a block diagram illustrating a host apparatus according to an embodiment of the present disclosure.

FIG. 2 is a block diagram illustrating a host apparatus according to an embodiment of the present disclosure.

Referring to FIG. 2, the host apparatus 10 includes a communication interface unit 100, a storage unit 110, a user interface unit 120, a job information generating unit 130, a workform generating unit 140, and a host control unit 150. The host apparatus 10 may serve as the workform management server 20.

The communication interface 100 is connected to the workform management server 20 through a communication network. In particular, the communication interface unit 100 transmits a workform which is generated according to a series of following processes, to the workform management server 20. In detail, the communication interface unit 100 may include a parallel port, a Universal Serial Bus (USB) port, a wireless port, etc.

The storage unit 110 stores a workform which is generated by the workform generating unit 140.

The user interface unit 120 includes a plurality of function keys through which a user of the host apparatus 10 performs a setting or a selecting, and displays various types of information provided from the host apparatus 10. Meanwhile, the user interface unit 120 may be implemented using a device that performs both input and output, for example, a touch pad, or a device that are coupled to a mouse or a monitor. A user may input a workform generating command by use of a user interface window which is provided through the user interface unit 120.

A job information generating unit 130 generates the job information that records a series of job processes about editing of a sample image performed by a user through an image editor.

The workform generating unit 140 generates a workform which includes job information for image editing. In detail, the workform generating unit 140 generates a workform in a manner that an image editing plug-in is linked to the job information for image editing. Accordingly, the job information for image editing is analyzed by the image editing plug-in, and thus the image editing plug-in edits a desired image according to the job information.

The host control unit 150 may be configured to control the job information generating unit 130 and the workform generating unit 140 such that the job information generating unit 130 and the workform generating unit 140 generate the job information and the workform, respectively. In detail, the host control unit 150 may control the job information generating unit 130, the workform generating unit 140, the storage unit 110 and the communication interface 100 such that job information used to perform a desired image editing is generated by the job information generating unit 130 upon reception of input by a user, a workform including job information is generated by the workform generating unit 140, the generated workform is stored in the storage unit 110, and the workform stored in the storage unit 110 is transmitted to the workform management server 20 by the communication interface unit 100.

In this manner, according to the workform management system of an embodiment of the present disclosure, the host apparatus 10 generates job information for image editing and a workform which includes the job information. Accordingly, a series of image editing processes that are repeatedly occurring are automatically performed by executing the workform.

Figure 3:
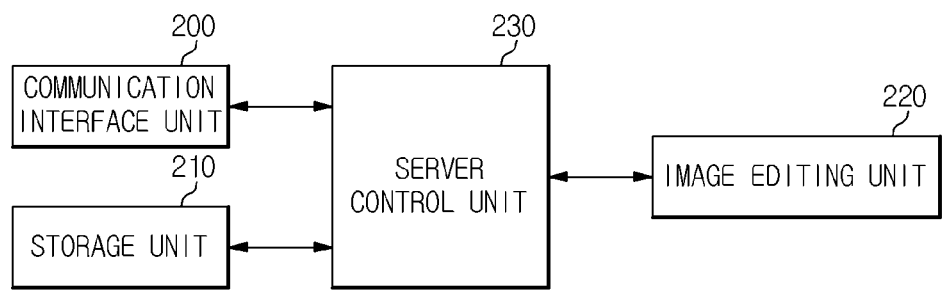
FIG. 3 is a block diagram illustrating a workform management server according to an embodiment of the present disclosure.

FIG. 3 is a block diagram illustrating a workform management server according to an embodiment of the present disclosure.

Referring to FIG. 3, the workform management server 20 includes a communication interface unit 200, a storage unit 210, an image editing unit 220, and a server control unit 230. The workform management server 20 may serve as the host apparatus 10.

The communication interface unit 200 is connected to the host apparatus 10 and the image forming apparatus 30 through a communication network. In particular, the communication interface unit 200 receives a workform including an image editing plug-in from the host apparatus 10, transmits the received workform to the image forming apparatus 30 and receives a scanned image from the image forming apparatus 30.

The storage unit 210 stores a workform which is transmitted from the host apparatus 10 and includes the job information for image editing. In addition, the storage unit 210 stores a scanned image which is transmitted from the image forming apparatus 30. In addition, the storage unit 210 stores a scanned image (an original image) and an image which has been edited in the image editing unit 220.

The image editing unit 220 edits a scanned image which is transmitted from the image forming apparatus 30, according to details of a series of job processes that are recorded in the job information for image editing, thereby generating an edited new image.

The server control unit 230 receives a workform which includes image editing information, from the host apparatus 10 through the communication interface unit 200 stores the received workform in the storage unit 210, transmits the workform which is stored in the storage unit 210, to the image forming apparatus 30 upon a request by the image forming apparatus 30, receives an image which is scanned by the image forming apparatus 30 according to execution of the workform in the image forming apparatus 30, and edits the received scanned image according to details of job processes recorded in the job information for image editing, thereby generating an edited new image.

In this example of the workform management system, according to execution of a workform, the workform management server 20 automatically edits a scanned image which is transmitted from the image forming apparatus 30, by use of an image editing plug-in to generate an edited new image and stores the generated new image, thereby automatically performing repetitive image editing processes.

Figure 4:
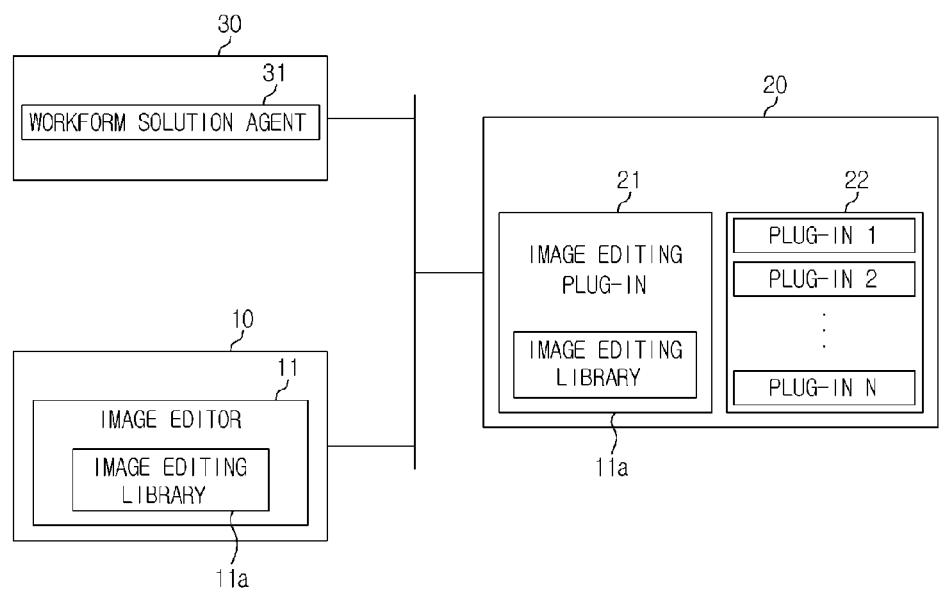
FIG. 4 is a conceptual diagram illustrating a workform management system according to an embodiment of the present disclosure.

FIG. 4 is a conceptual diagram illustrating a workform management system according to an embodiment of the present disclosure.

Referring to FIG. 4, the host apparatus 10 of the workform management system includes an image editor 11. For example, the image editor 11 may be a program, such as Paint Shop, that has functions in enlarging, reducing, cropping and pasting images to form a final output file from a plurality of images through these functions. The image editor 11 forms a setting file about a process of forming the final output file, the setting file to be used in a software represented by a XML.

The image editor 11 has an image editing library 11a. The image editing library 11a may be implemented using DLL (Dynamic Link Library) which is used in the image editor 11 and the image editing plug-in of the workform management server 20 in common, or using JAR (Java archiver) of Java. The image editing library 11a has an image editing function capable of importing the image editing library 11a from an external program and performing a function related to image editing.

The workform management server 20 includes an image editing plug-in 21. The image editing plug-in 21 edits an image by performing the job information for image editing included in a workform that is generated in the host apparatus 10. To this end, the image editing plug-in 21 has the same image editing library as the image editing library 11a of the image editor 11 of the host apparatus 10.

The workform management server 20 transmits a workform to the image forming apparatus 30 upon a request of the image forming apparatus 30 such that a user uses the workform in the image forming apparatus 30 through a plurality of plug-ins which are provided by the workform management server 20. Then, the workform management server 20 transmits the workform and a scanned image which is scanned and received from the image forming apparatus 30 according to execution of the workform, to the image editing plug-in 21 and the plug-in 22 to perform a next job which is recorded in the workform, on the scanned image. Thereafter the workform management server 20 records a success of the job processing and log information related to the job processing.

The plug-in 22 represents a software required when processing a job that is provided by the workform management server 20. For example, the plug-in 22 includes a plug-in used to send a fax, a plug-in used to send an email, and a plug-in used to move and store a scanned image and an edited image having been subject to an image editing to a folder location selected by a user.

The image editing plug-in 21 is a plug-in used in the workform management system, and represents a software technology of proceeding independent and individual jobs.

When generating a workform, the image editing plug-in 21 provides a user interface configured to import a setting file which is generated by the image editor 11 and records job information for image editing to input a setting value in the setting file, and then inserts details of the setting file in the workform. If the workform is executed, the image editing plug-in 21 edits a scanned image according to the details of the setting, thereby generating an edited output file.

The image forming apparatus 30 includes a workform solution agent 31 that executes a job which is used to receive a workform from the workform management server 20, and a job which is recorded in the workform from execution of the received workform.

The workform solution agent 31 is a program which interoperates with the workform management server 20. The workform solution agent 31 displays workforms which are generated in the workform management server 20, to a user, performs a scanning based on a workform selected by the user, and returns a scanned image and the executed workform to the workform management server 20. If necessary, the workform solution agent 31 may request a user authentication or only display a user specified workform.

Hereinafter, the following description will be made in relation to operation processes of the workform management system according to an embodiment of the present disclosure, the processes including a process of generating a combined image by inserting a scanned citizen's identification card to a loan application image or to a bank account application, and a process of reducing the size of the respective images to store images for a long period of time.

Figure 5:
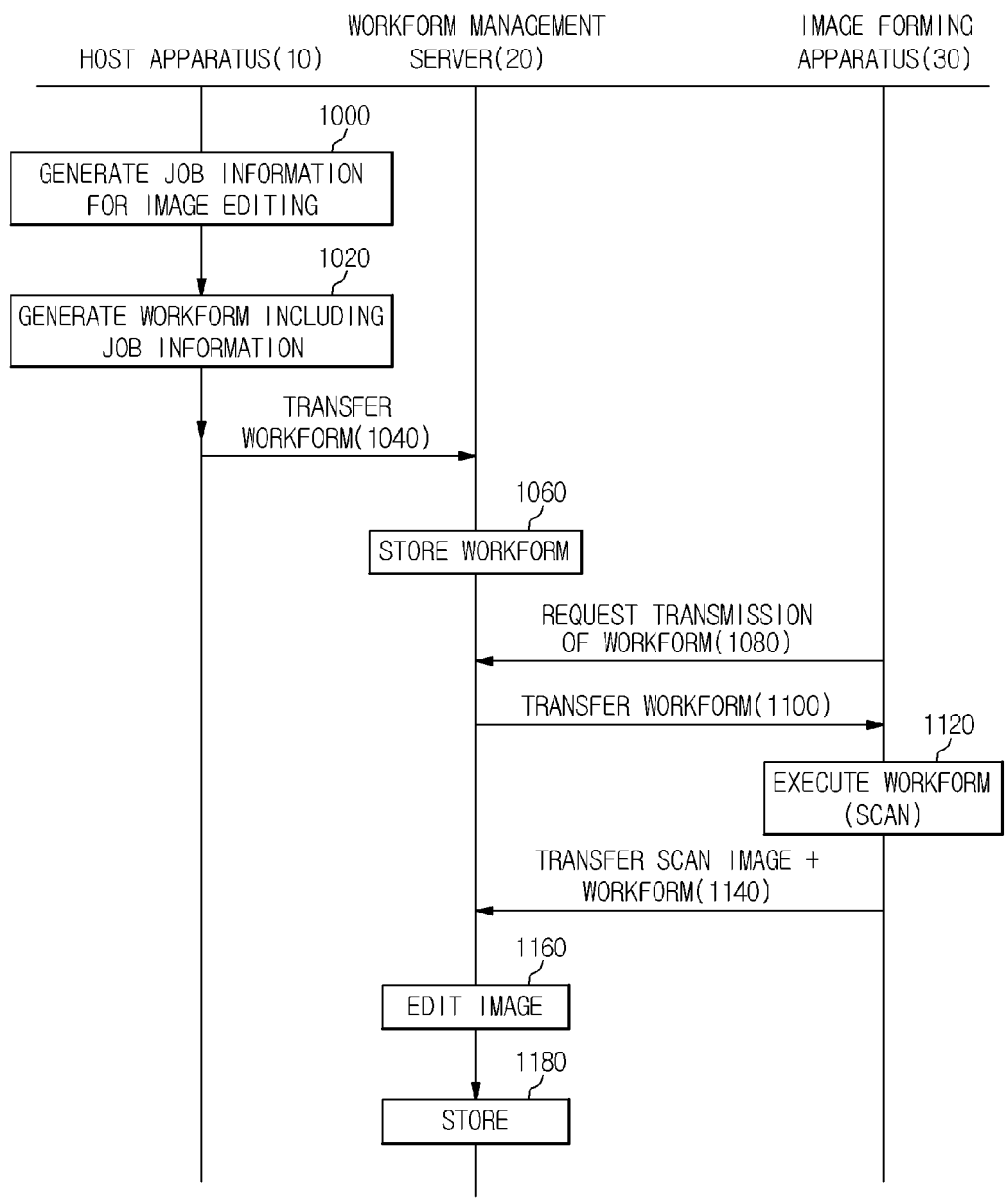
FIG. 5 is a control flow illustrating a control method of a workform management system according to an embodiment of the present disclosure.

FIG. 5 is a control flow illustrating a process in which job information for image editing is generated, a workform including the job information is generated, and a scanned image is edited according to the job information when the workform is executed in a workform management system.

Figure 6:
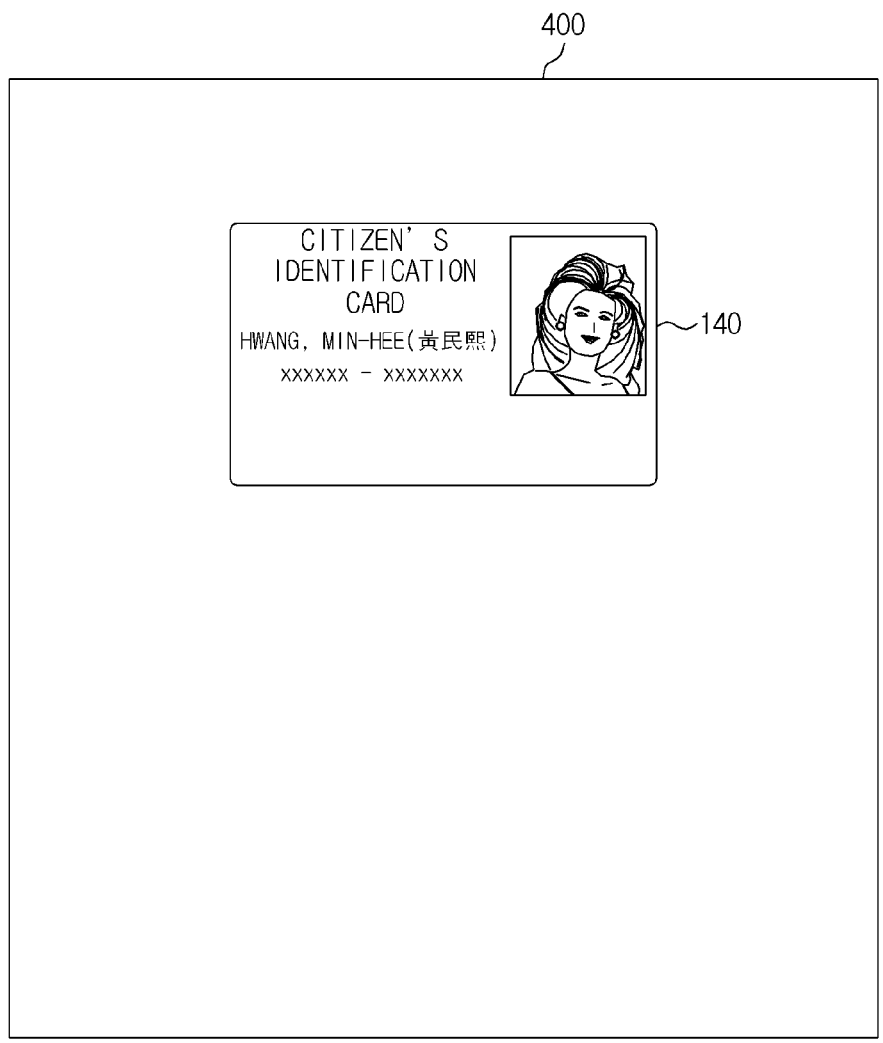
FIG. 6 is a diagram illustrating a citizen's identification card which is used to generate job information for image editing in a host apparatus of a workform management system according to an embodiment of the present disclosure.

Before executing the image editor 11 of the host apparatus 10, a user prepares a scanned image by performing a scanning by use of scan setting values, for example, resolution, color mode, and file type, that are to be used in a workform. In this case, a citizen's identification card, a loan application, and a bank account application are used, and each of the citizen's identification card, the loan application, and the bank account application is stored in image files, for example, jpg image files (see FIGS. 6 to 8).

Thereafter, the host apparatus 10 generates job information for image editing in a manner to record a process in which a user edits the three scanned images through the image editor 11 (1000).

Hereinafter, a process of generating job information for image editing will be described in detail.

Figure 9:
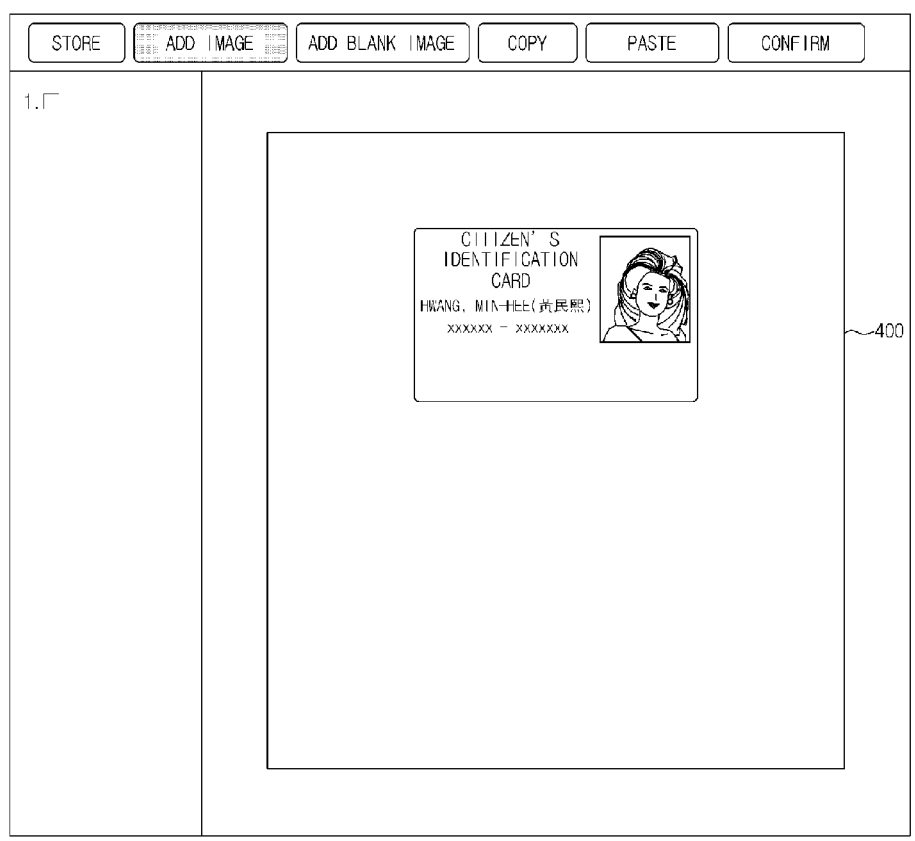
FIG. 9 is a diagram illustrating a screen of an image editor of a host apparatus of a workform management system according to an embodiment of the present disclosure.

As shown in FIG. 9, a screen of the image editor 11 manipulated by a user includes an upper portion and left/right portions obtained by laterally dividing a lower portion of the screen. The upper portion has a "store" button, an "add image" button, a "blank" button, a "copy" button, a "paste" button, and a "confirm" button. The left portion shows the name of an added image and a small picture for the added image provided in the form of a thumbnail. The right portion shows an original size image or an enlarged size image of the added image. FIG. 9 shows a #1 image 400 already added.

A user executes the image editor 11 and clicks the "add image" button, thereby adding jpg image files each corresponding to the citizen's identification card, the loan application, and the bank account application. In the image editor 11, the citizen's identification card, the loan application, and the bank account application are represented by the #1 image 400, a #2 image 500, and a #3 image 600, respectively.

Figure 10:
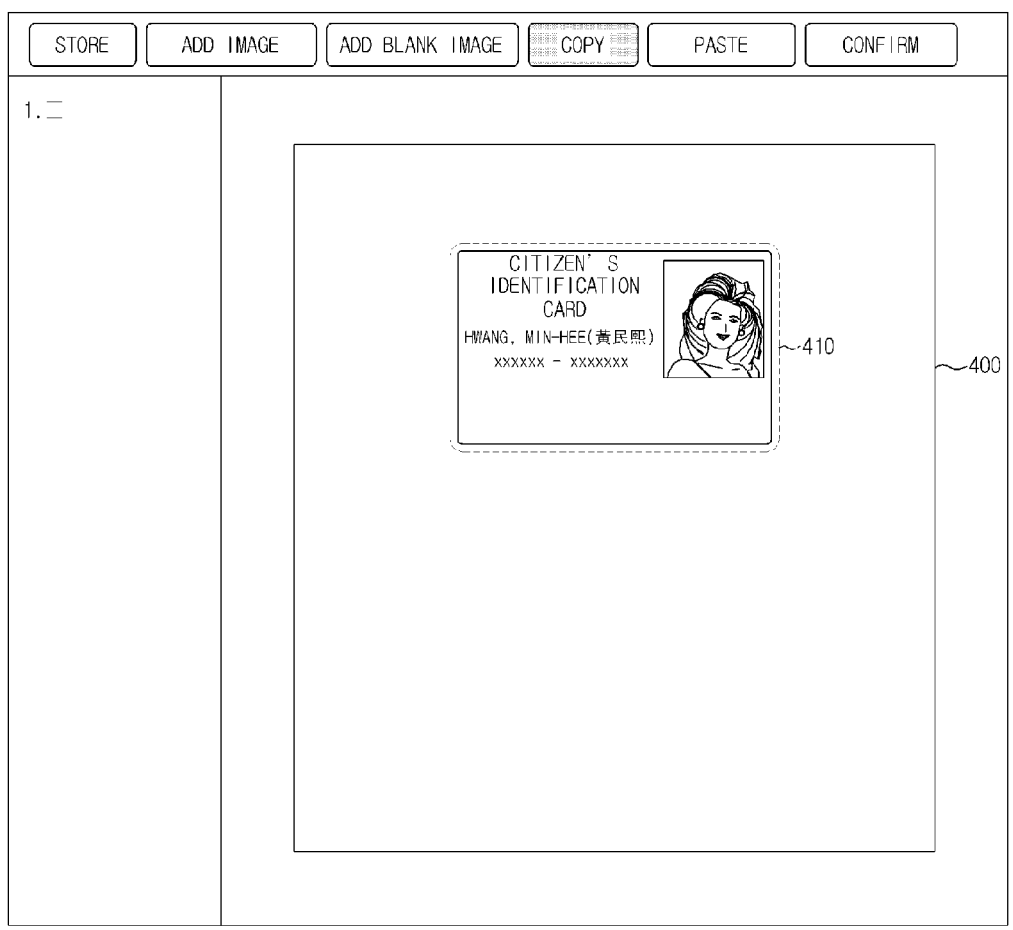
FIG. 10 is a diagram used to explain a process of copying a desired area from the entire area of the citizen's identification card shown in FIG. 9.

The user copies the entire block of a citizen's identification card image 410 from the #1 image 400 (see FIG. 10).

Figure 11:
FIG. 11 is a diagram used to explain a process of pasting the copied area of the citizen's identification card to a relevant area of the loan application.

The copied image 410 is pasted to the #2 image 500 and then is disposed on an area 510 where the citizen's identification card image 410 is desired to be positioned in the #2 image 500, so that a #2-1 image 500' is generated (see FIG. 11). When an original image is subject to editing, the image editor 11 generates a new image without substantially changing the original image. Accordingly, the user's convenience for image editing is provided, and the whole process of image editing is verified.

Figure 12:
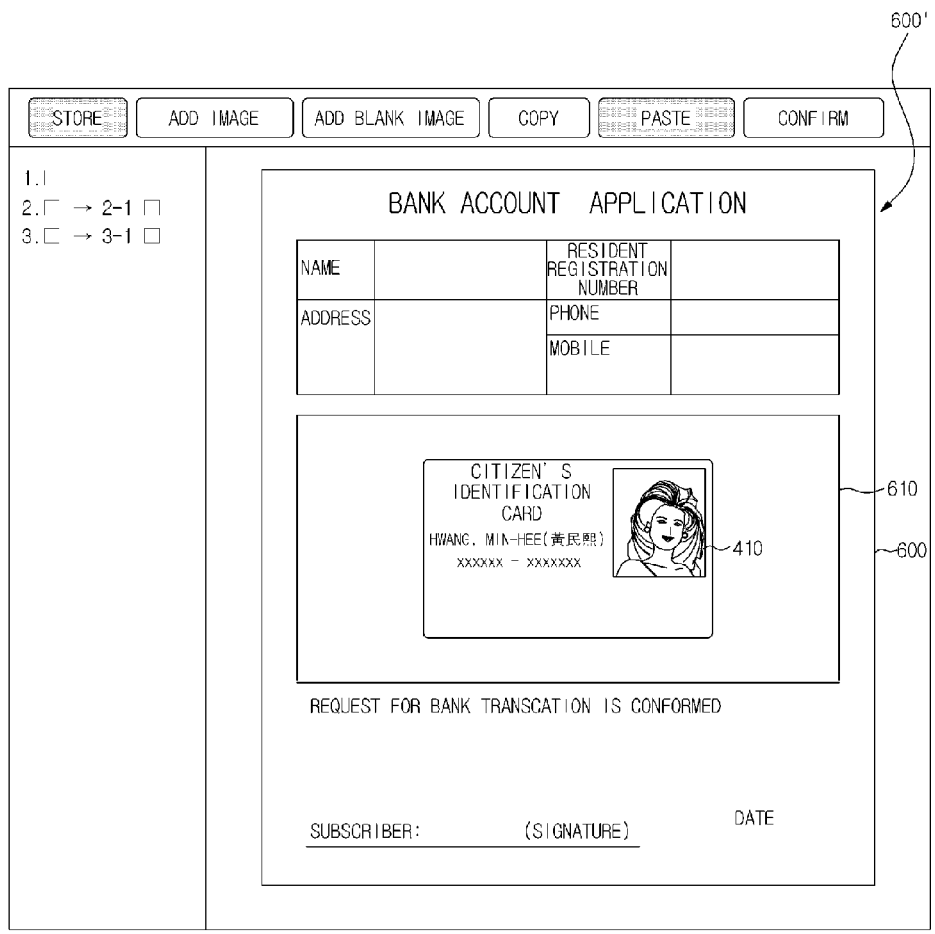
FIG. 12 is a diagram used to explain a process of pasting the copied area of the citizen's identification card to a relevant area of the bank account application.

Similarly, a #3-1 image 600' is generated by pasting the image 410 to the #3 image 600 and then disposing the image 410 on an area 610 where the citizen's identification card image 410 desired to be positioned in the #3 image 600 (see FIG. 12).

The user may generate a #2-2 image having a size smaller than that of the #2-1 image 500' both in width and length by reducing the size of the #2-1 image 500 having the citizen's identification card image 410 inserted thereto.

Similarly, a #3-2 image having a size smaller than that of the #3-1 image 600' may be generated by reducing the size of #3-1 image 600.

For the #2-1, #2-2, #3-1, and #3-2 images, the user sets that each of the #2-1, #2-2, #3-1, and #3-2 images represents an output file by pressing the "confirm" button.

Thereafter, the user stores a setting file that records details of the jobs which have been performed above, by clicking the "store" button.

The details of the jobs in the setting file represent data that is related to operation of a user and is automatically recorded by the image editor 11. The details of the jobs in the setting file are shown in FIG. 13. In this manner, job information for image editing is generated and stored.

Figure 14:
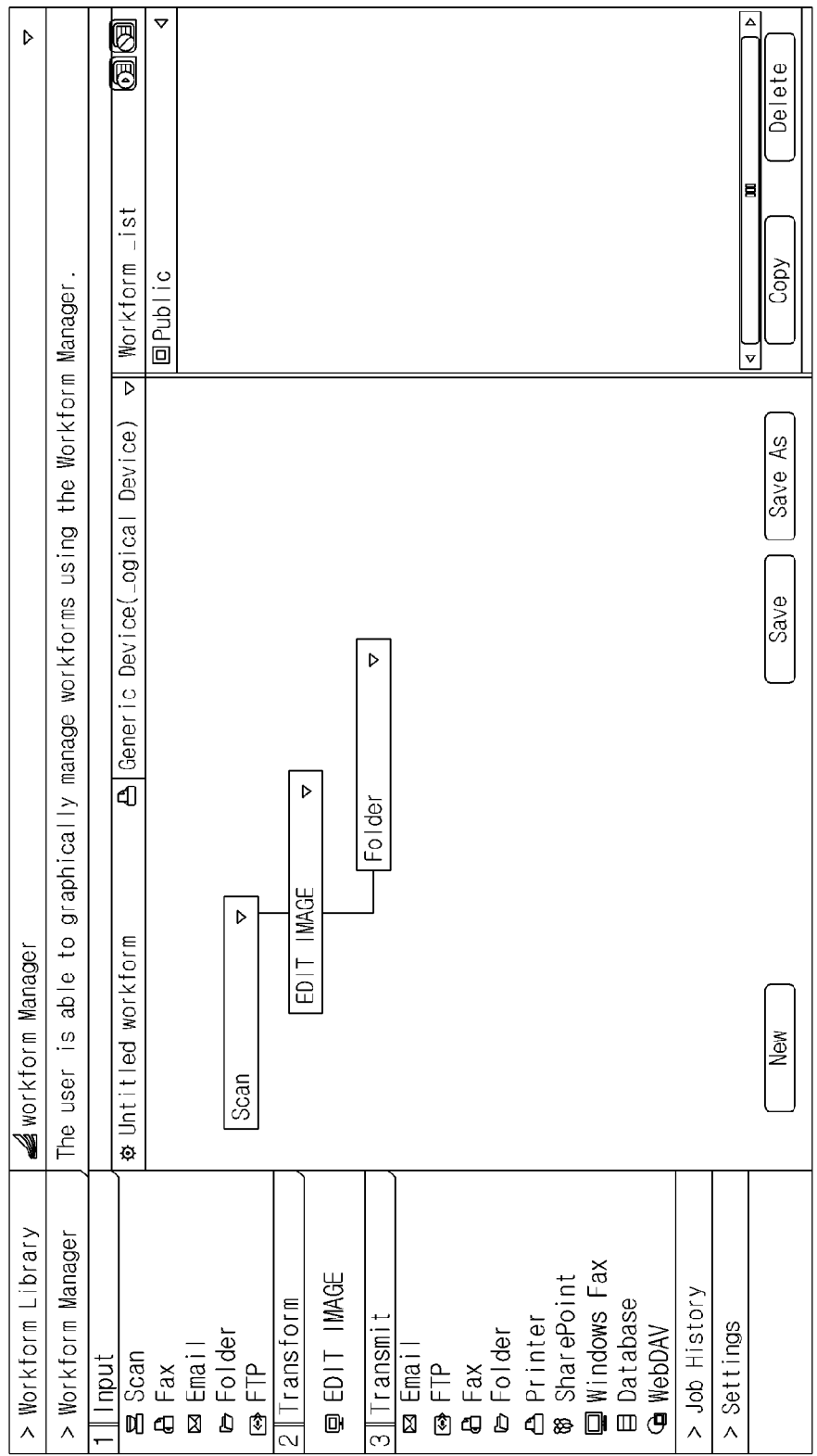
FIG. 14 is a diagram illustrating a screen which displays how a workform is generated in a host apparatus of a workform management system according to an embodiment of the present disclosure.

After the job information for image editing is generated as described above, in order to generate a workform which includes the job information, a user displays a workform generating screen (see FIG. 14) and selects a scan as an input plug-in, an image editing plug-in as a transform plug-in, and a folder as a transmit plug-in.

Figure 15:
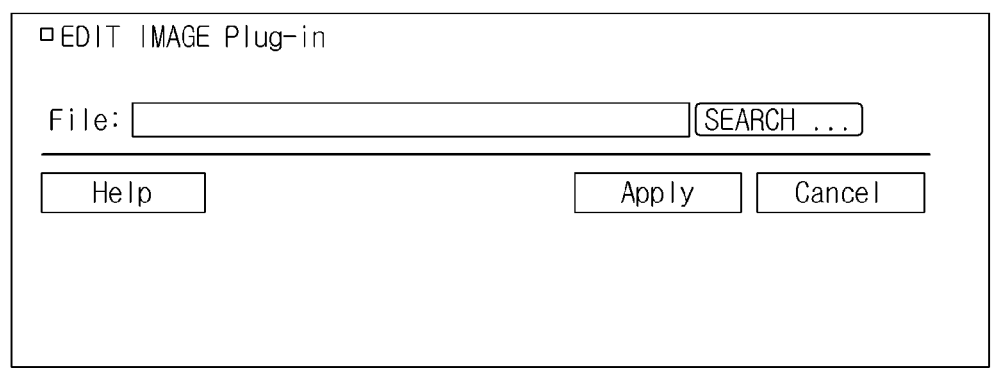
FIG. 15 is a diagram illustrating a user interface screen of an image editing plug-in that is provided when an image editing is selected in the screen shown in FIG. 14.

After the scan plug-in is subject to a setting, the setting file generated in the above is imported through an image editing plug-in screen (see FIG. 15); then a series of job processes for image editing are obtained from the setting file, and are filled in a workform to be generated.

The folder plug-in is also subject to a predetermined setting, and then the workform is stored.

In this manner, a workform having an XML file type and including the job information for image editing is generated (1020).

The workform is transmitted to the workform management server 20 (1040), and stored in the workform management server 20 (1060).

After the workform is stored in the workform management server 20, a user executes the workform solution agent 31 of the image forming apparatus 30 and selects the workform which has been generated as shown in the above, in a workform list.

The image forming apparatus 30 requests the workform management server 20 to transmit the workform selected by the user (1080).

The workform management server 20 transmits the requested workform to the image forming apparatus 30 (1100).

The user prepares documents of a citizen's identification card, a loan application, and a bank account application in the order in which the documents are to be scanned. The user places the documents on a planar scanner of the image forming apparatus 30, starting with the citizen's identification card, and executes the workform.

Accordingly, the image forming apparatus 30 scans the documents in the order of the citizen's identification card, the loan application, and the bank account application (1120).

The scanned documents are generated into jpg file images. The workform solution agent 31 transmits the executed workform and the scan images generated to the workform management server 20 (1140). The workform server 20 temporarily stores the workform and the scanned images in a temporary folder on a network.

The workform server 20 performs an image editing of combining the scanned images that are received together with the details of job recorded in the job information for image editing in the received workform (1160).

Hereinafter, a process of editing an image will be described in detail.

First, the workform management server 20 parses a workform which is received from the image forming apparatus 20, and invokes s a predetermined plug-in which is configured to perform a job that is set to follow the scanning job in the workform. The workform and the three scanned images are transmitted to the image editing plug-in 21.

At this time, the image editing plug-in 21 starts performing a job according to the XML job processes shown in FIG. 13.

That is, the details of the job information for image editing included in the workform are detected and obtained. In FIG. 16, input files described in the "<ImageInput>" are checked. The number of files described in the "<ImageInput>" is three, and the type of the files is jpg. Also, the number of the input files received by the image editing plug-in 21 is three, and the type of the input files is jpg. Accordingly, the image editing plug-in 21 proceeds its operation.

However, if the number and the type of the input files described in the "<ImageInput>" are different from those of the input files transmitted from the workform management server 20, the image editing plug-in 21 does not proceed its operation of processing the job and ends its operation. At this time, the image editing plug-in 21 transfers a return value of a job failure along with the information representing details of the job failure.

If the checking of the input file is completed, the image editing plug-in 21 obtains a part corresponding to the "<Edit>" from the details of the job in the workform, and sequentially performs jobs corresponding to the part.

To this end, a first job element is analyzed. The first job element is identified as a job type of the "Copy" from analyzing Type="Copy". In addition, an input corresponding to the first job element is identified as the first input file among input files from analyzing InImage="1".

Details of the Copy job are described in a Copy element. In the Copy job, the image editing plug-in 21 detects coordinates and an area that are needed to be subject to copying in an image (for example, X=4, Y=1, Width=249, and Height=156).

Based on the collected information as above, the image editing plug-in 21 invokes the image editing library 11*a* to perform the copying on the citizen's identification card corresponding to the first input file and temporarily stores a result file of the copying, and the file is recorded as a #4 image (OutImage="4") shown in the details of the copy job.

After the first job is completed, and a next job element (that is, the second job element) is analyzed such that the second job is processed.

The second job is detected as a job type of "Paste". In addition, an input corresponding to the second job is identified as the second input file, that is, the loan application.

Details of the paste job are detected from analyzing a Paste Element; that is, the second job element.

An image to be pasted is determined as the #4 image (Paste Image="4") that has been previously copied. An area needing to be subject to paste in the #2 image 500 is determined by reading x and y coordinates.

Based on the collected information as above, the image editing plug-in 21 invokes the image editing library 11*a* to paste the #4 image to the #2 image corresponding to the loan application, and a result of the pasting is recorded as a #5 image (OutImage="5") shown in the details of the paste job.

In this manner, the second job is completed, and a third job element is analyzed.

A third job is detected as a job type of Paste and an input corresponding to the third job element is identified as the third input file that is, the bank account application.

Details of the paste job are detected from analyzing a Paste Element; that is, the third job element.

An image to be pasted is determined as the #4 image that has been previously copied, and an area needing to be subject to paste in the #3 image 500 is determined by reading x and y coordinates.

Based on the collected information as above, the image editing plug-in 21 invokes the image editing library 11*a* to paste the #4 image to the #3 image 500, and a result of the pasting is recorded as a #6 image (OutImage="6") shown in the details of the Paste job.

In this manner, the third job is completed, and a fourth job element is analyzed.

A fourth job is detected as a job type of Size and an input corresponding to the fourth job element is identified as the #5 image (InImage="5"), that is, the image of the loan application having a part of the citizen's identification card attached thereto. Details of size job are detected from analyzing Size element, that is, the fourth job element. In this case, the details of the size job involve reducing the scale of the #5 image by 0.25%.

In performing the fourth job, the image editing library 11*a* is invoked to reduce the scale of the #5 image by 0.25%, and a result of the resizing is recorded as a #7 image (OutImage="7").

Similarly, a fifth job is detected as a job type of Size, and an input file is identified as the #6 image (InImage="6"); that is, an image of the bank account application having the citizen's identification card attached thereto. Details of the size job are detected from analyzing a size element. In this case, the details of the size job involve reducing the scale of the #6 image by 0.25%.

To this end, the image editing library 11*a* is invoked to reduce the scale of the #6 image by 0.25%, and a result of the resizing is recorded as a #8 image (OutImage="8").

After all jobs described in the <Edit> edit elements are processed, the image editing plug-in 21 creates an output file including an output image by analyzing an <ImageOutput>.

Figure 17:
FIG. 17 is a diagram illustrating an image of a loan application combined with a citizen's identification card based on an image editing process in a workform management server of a workform management system according to an embodiment of the present disclosure.

That is, the first output file corresponds to the #5 image and is generated in the form of jpg (see FIG. 17).

Figure 18:
FIG. 18 is a diagram illustrating an image of a bank account application combined with a citizen's identification card based on an image editing process of a workform management server in a workform management system according to an embodiment of the present disclosure.

The second output file corresponds to the #6 image and is generated in the form of jpg (see FIG. 18).

Figure 19:
FIG. 19 is a diagram illustrating a downsized image of the image shown in FIG. 17.

The third output file corresponds to the #7 image and is generated in the form of jpg (see FIG. 19).

Figure 20:
FIG. 20 is a diagram illustrating a downsized image of the image shown in FIG. 18.

The fourth output file corresponds to the #8 image and is generated in the form of jpg (see FIG. 20).

Since the above output files are each provided in the form of jpg, an additional job does not have to be performed on the output files.

The image editing plug-in 21 transfers the output files to the storage unit 210 of the workform management server 20, and temporarily stores the output files in the storage unit 210. At this time, the original scan images may be stored together with the output files. After storing the output files, the image editing job may be completed.

The workform management server 20 sends a next plug-in, for example, a folder plug-in, the images output through the image editing plug-in 21 and the workform such that the folder plug-in operates.

The folder-plug performs a folder plug-in related job included in the received workform to store the output files in a predetermined location (1180).

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A method of generating a workform that defines a job sequence, the method comprising:
    generating job information used to edit an image which is scanned by an image forming apparatus; and
    generating the workform including the generated job information.

2. The method of claim 1, wherein in the generating of the job information, the job information is a data that records a series of editing processes that are performed by a user on a sample image through an image editor.

3. The method of claim 1, wherein in the generating of the job information, the job information comprises job information used to combine a plurality of images scanned by the image forming apparatus.

4. The method of claim 1, wherein in the generating of the job information, the job information comprises job information that is used to reduce a size of at least one of an original image and an edited image.

5. The method of claim 1, wherein in the generating of the workform, the job information is included in the workform such that the job information is linked to an image editing plug-in that is configured to import an image and edit the imported image.

6. The method of claim 5, wherein in the generating of the workform, the workform is generated in an eXtensible Markup Language (XML) format.

7. A method of editing an image using a workform that defines a job sequence, the method comprising:
    transmitting the workform selected by a user to an image forming apparatus;
    scanning the image by executing the workform;
    receiving the scanned image from the image forming apparatus; and
    editing the received scanned image based on the job information which is included in the workform and is used to edit an image.

8. The method of claim 7, wherein the editing of the received image comprises
    detecting a series of job processes of the job information and editing the received image according to the series of job processes by use of an image editing plug-in that is configured to import an image and edit the imported image.

9. A host apparatus configured to generate a workform that defines a job sequence, the host apparatus comprising:
    a user interface unit configured to provide an interface to a user;
    a job information generating unit configured to generate job information which is used to edit an image that is scanned by the image forming apparatus, according to an input by the user;
    a workform generating unit configured to generate a workform in which the job information generated in the job information generating unit is linked to an image editing plug-in that imports the scanned image and edits the imported image;
    a storage unit configured to store the job information generated by the job information generating unit and the workform generated by the workform generating unit; and
    a host control unit configured to control the job information generating unit and the workform generating unit such that the job information generating unit and the workform generating unit generate the job information and the workform, respectively.

10. The host apparatus of claim 9, wherein the job information comprises at least one of job information which is used to combine a plurality of images scanned by the image forming apparatus, and job information which is used to reduce a size of at least one of an original image and an edited image.

11. The host apparatus of claim 9, wherein the job information generating unit generates a file that records a series of editing processes that are performed by a user on a sample image through an image editor.

12. The host apparatus of claim 11, wherein the job information is formed in a command that is executable in the image editing plug-in such that the image editing plug-in imports an image that is scanned by the image forming apparatus and edits the imported image according to the job information.

13. A workform management server connected to an image forming apparatus, the workform management server comprising:
    a storage unit configured to store a workform comprising job information that is used to edit an image;
    a communication interface unit configured to receive an image that is scanned by the image forming apparatus that executes the workform;
    an image editing unit configured to detect the job information by analyzing the workform and to edit the received image based on the detected job information; and
    a server control unit configured to control the image editing unit such that the received image is edited and to store the edited image in the storage unit.

14. The workform management server of claim 13, wherein the image editing unit comprises an image editing plug-in which is configured to import an image and edit the imported image, and wherein the image editing unit detects a series of job processes of the job information by use of the image editing plug-in and edits the received image according to the series of job processes.

15. A workform management system comprising:
- a host apparatus configured to generate job information used to edit an image which is scanned by an image forming apparatus when a workform defined a job sequence is executed, and to generate a workform comprising the job information;
- an image forming apparatus configured to receive the workform from the host apparatus, perform a scanning by executing the received workform and send a scanned image; and
- a workform management server configured to receive the scanned image from the image forming apparatus, detect the job information by analyzing the workform, edit the received image based on the detected job information and store the edited image.

16. The workform management system of claim 15, wherein the job information generated in the host apparatus comprises at least one of job information which is used to combine a plurality of images scanned by the image forming apparatus, and job information which is used to reduce a size of at least one of an original image and an edited image.

17. The workform management system of claim 15, wherein the workform management server comprises an image editing unit configured to detect the job information by analyzing the workform and to edit the received image based on the detected job information; and wherein image editing unit comprises an image editing plug-in which is configured to import an image and edit the imported image, and wherein the image editing unit detects a series of job processes of the job information by use of the image editing plug-in and edits the received image according to the series of job processes.

18. The method of claim 7, further comprising generating the job information used to edit an image which is scanned by the image forming apparatus.

19. The method of claim 7, further comprising storing the edited image.

* * * * *

UNITED STATES PATENT AND TRADEMARK OFFICE
CERTIFICATE OF CORRECTION

PATENT NO.        : 8,873,110 B2                                   Page 1 of 1
APPLICATION NO.   : 13/554086
DATED             : October 28, 2014
INVENTOR(S)       : Ha Young Yoon It is certified that error appears in the above-identified patent and that said Letters Patent is hereby corrected as shown below:

In the Claims

Claim 7, Column 14, Line 4:

Delete "on the", insert --on-- therefor.

Signed and Sealed this
Thirtieth Day of June, 2015

Michelle K. Lee
*Director of the United States Patent and Trademark Office*